US012703497B2

(12) United States Patent
Remy

(10) Patent No.: US 12,703,497 B2
(45) Date of Patent: Aug. 11, 2026

(54) ASSEMBLY FOR IDENTIFYING OBSTRUCTING FOREIGN MATTER IN AN AIR INTAKE OF AN AIRCRAFT PROPULSION SYSTEM AND METHOD OF USING SAME

(71) Applicant: Pratt & Whitney Canada Corp., Longueuil (CA)

(72) Inventor: Patrice Remy, St-Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 162 days.

(21) Appl. No.: 18/824,535

(22) Filed: Sep. 4, 2024

(65) Prior Publication Data

US 2026/0062134 A1 Mar. 5, 2026

(51) Int. Cl.
*B64D 33/02* (2006.01)
*B64F 5/40* (2017.01)
*B64F 5/60* (2017.01)

(52) U.S. Cl.
CPC ................ *B64D 33/02* (2013.01); *B64F 5/40* (2017.01); *B64F 5/60* (2017.01); *B64D 2033/022* (2013.01)

(58) Field of Classification Search
CPC ..... B64D 2033/022; B64D 33/02; F02C 7/05; F02C 7/052
See application file for complete search history.

(56) References Cited

U.S. PATENT DOCUMENTS 3,940,622 A 2/1976 Stallabrass
4,250,703 A * 2/1981 Norris .................... B64D 33/02 55/306
6,134,874 A 10/2000 Stoten
10,082,243 B1 * 9/2018 Hagshenas .............. F02C 7/047
11,731,778 B1 * 8/2023 Girard ........................ F02C 9/18 60/39.092
11,879,345 B2 1/2024 Holl
11,965,460 B1 * 4/2024 Ramamurthy ......... B64D 33/02
12,365,473 B1 * 7/2025 Labrecque ................ F02C 7/05
(Continued)

FOREIGN PATENT DOCUMENTS

CA 3081862 A1 * 1/2021 ............. B64D 45/00
CA 3218076 A1 * 4/2024 ............. B64D 33/02
(Continued)

OTHER PUBLICATIONS

EP Search Report for EP Patent Application No. 25200031.0 dated Jan. 28, 2026.

*Primary Examiner* — Christopher P Ellis
(74) *Attorney, Agent, or Firm* — Getz Balich LLC

(57) ABSTRACT

An aircraft propulsion system includes an air intake and an air intake control system. The air intake includes an intake body forming an air passage. The air intake control system includes a flow control member disposed within the air intake, a blockage sensor having a sensing area directed to the flow control member, and a controller. The blockage sensor is configured to produce a signal indicative of an accumulation of foreign matter on the flow control member. The controller is configured to identify a presence or an absence of an obstruction condition of the flow control member and remove the foreign matter from the flow control member, in response to identifying the presence of the obstruction condition, by changing a state of the flow control member.

20 Claims, 12 Drawing Sheets

(56) References Cited

U.S. PATENT DOCUMENTS

| | | | | |
|---|---|---|---|---|
| 12,546,254 | B1 * | 2/2026 | Xu | F02C 7/052 |
| 2019/0153944 | A1 | 5/2019 | Snyder | |
| 2019/0226403 | A1 * | 7/2019 | Burnside | F02C 7/042 |
| 2020/0284192 | A1 * | 9/2020 | Haynes | B64C 29/0033 |
| 2021/0394913 | A1 | 12/2021 | Anderson | |
| 2024/0141833 | A1 | 5/2024 | Akcayoz | |
| 2025/0084796 | A1 * | 3/2025 | Thomassin | B60K 6/00 |

FOREIGN PATENT DOCUMENTS

| | | | | | |
|---|---|---|---|---|---|
| CN | 107000850 | A | * | 8/2017 | F02C 7/18 |
| EP | 3392144 | A1 | * | 10/2018 | B64D 33/02 |
| FR | 2554507 | A1 | * | 5/1985 | B64D 33/02 |
| FR | 3044357 | A1 | * | 6/2017 | B64D 33/02 |
| WO | WO-0212690 | A1 | * | 2/2002 | B64D 33/02 |

* cited by examiner 88
38
102,102B
54
46
108

88
38
102,102B
46
54
108

88
102,102D
52
38

88
102,102D
52
38

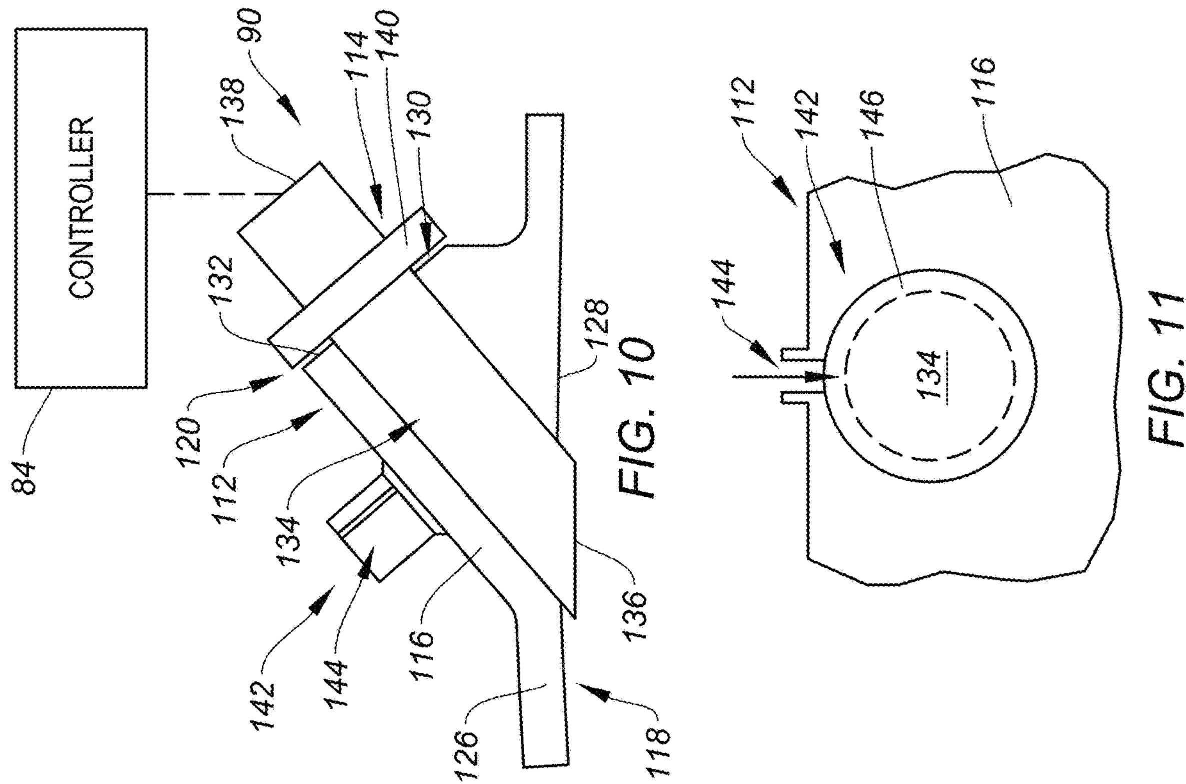
FIG. 10
FIG. 11
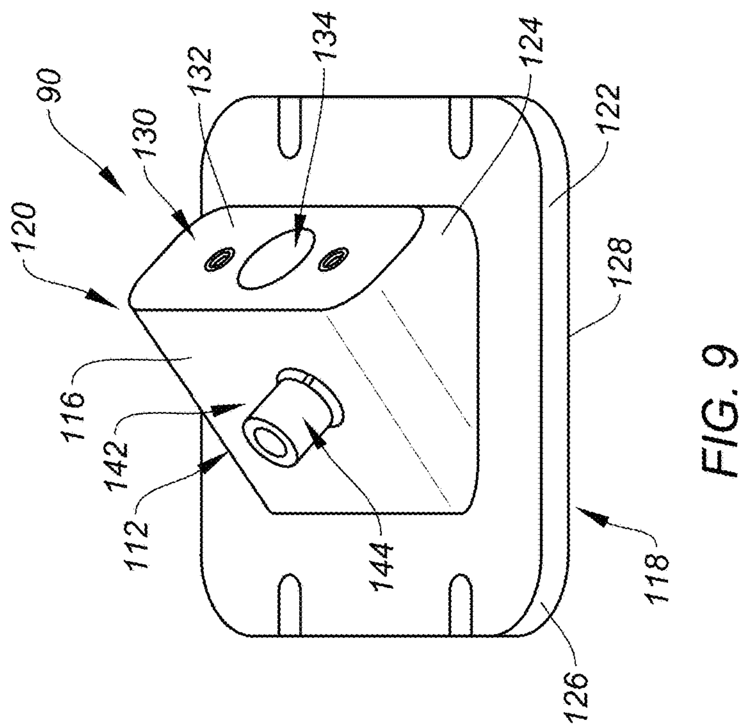
FIG. 9

38
90
112
98,102A
88
114
44
148
150

38
88
150
98,102D
148
112
114
90
44

38
114
90
44
148
152
112
150

38
114
90
112
44
150
98,102C
148
88

38
88
148
98,102B
150
44
114
90
112

ASSEMBLY FOR IDENTIFYING OBSTRUCTING FOREIGN MATTER IN AN AIR INTAKE OF AN AIRCRAFT PROPULSION SYSTEM AND METHOD OF USING SAME

TECHNICAL FIELD

This disclosure relates generally to air intakes for aircraft propulsion systems and, more particularly, to assemblies and methods for identifying and/or removing obstructing foreign matter from an air intake.

BACKGROUND OF THE ART

Some propulsion systems for aircraft may include an air intake configured to separate foreign matter (e.g., dust, debris, ice, etc.) entering the air intake from air which is supplied to an engine of the propulsion system. Various systems and methods are known in the art for controlling intake air flow and separating foreign matter from intake air. While these known systems and methods may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an aircraft propulsion system includes an air intake and an air intake control system. The air intake includes an intake body forming an air passage. The air intake control system includes a flow control assembly, a blockage sensor assembly, and a controller. The flow control assembly includes a flow control member and an actuator. The flow control member is disposed within the air intake. The actuator is operably connected to the flow control member to selectively change a state of the flow control member to change one or both of an air flow direction or an air flow rate of an air flow through the air passage. The blockage sensor assembly includes a blockage sensor having a sensing area directed to the flow control member. The blockage sensor is configured to produce a signal indicative of an accumulation of foreign matter on the flow control member within the sensing area. The controller is connected in signal communication with the blockage sensor. The controller includes a processor connected in signal communication with memory storing instructions which, when executed by the processor, cause the processor to identify a presence or an absence of an obstruction condition of the flow control member, the presence of the obstruction condition identified where the signal is indicative of the accumulation being greater than an accumulation threshold and remove the foreign matter from the flow control member, in response to identifying the presence of the obstruction condition, by controlling the actuator to change the state of the flow control member.

In any of the aspects or embodiments described above and herein, the flow control member may include an inflatable boot.

In any of the aspects or embodiments described above and herein, the actuator may include a fluid regulator connected in fluid communication with the inflatable boot. The fluid regulator may be configured to control the state of the inflatable boot between an inflated condition and a deflated condition.

In any of the aspects or embodiments described above and herein, removing the foreign matter from the flow control member may include repeatedly cycling the inflatable boot between the inflated condition and the deflated condition.

In any of the aspects or embodiments described above and herein, the blockage sensor assembly may include a mounting adapter mounting the blockage sensor to the intake body.

In any of the aspects or embodiments described above and herein, the mounting adapter may be mounted to the intake body on an exterior of the intake body.

In any of the aspects or embodiments described above and herein, the mounting adapter may include a heating assembly disposed at the blockage sensor.

In any of the aspects or embodiments described above and herein, the heating assembly may include an air inlet and an internal air passage. The air inlet may be connected in fluid communication with the internal air passage. The internal air passage may extend about the blockage sensor.

In any of the aspects or embodiments described above and herein, the air intake control system may further include an air flow sensor assembly within the air intake. The air flow sensor assembly may include one or more sensors configured to measure one or more air flow condition parameters within the air intake. The controller may be connected in signal communication with the air flow sensor assembly. Identifying the presence of the obstruction condition may further include identifying a presence or an absence of a reduced performance condition of the air intake using the one or more air flow condition parameters. The presence of the obstruction condition may be identified where the presence of the reduced performance condition is identified and the accumulation is greater than the accumulation threshold.

In any of the aspects or embodiments described above and herein, the one or more air flow condition parameters may include a differential pressure of the air intake. The reduced performance condition may be identified where the differential pressure is greater than a differential pressure threshold.

According to another aspect of the present disclosure, a method for removing foreign matter from a flow control assembly of an air intake of an aircraft propulsion system is provided. The method includes measuring, at a controller, an accumulation at a flow control member of the flow control assembly, identifying, at the controller, a presence or an absence of an obstruction condition of the flow control member, the presence of the obstruction condition identified where the accumulation is greater than an accumulation threshold, and removing the foreign matter from the flow control member, in response to identifying the presence of the obstruction condition, by controlling an actuator with the controller to change a state of the flow control member.

In any of the aspects or embodiments described above and herein, the flow control member may include an inflatable boot. Changing the state of the flow control member may include controlling the actuator to change a fluid pressure within the inflatable boot.

In any of the aspects or embodiments described above and herein, removing the foreign matter from the flow control member may include controlling the actuator to one or both of inflate or deflate the inflatable boot.

In any of the aspects or embodiments described above and herein, removing the foreign matter from the flow control member may include repeatedly cycling the fluid pressure between a lower fluid pressure and a higher fluid pressure.

In any of the aspects or embodiments described above and herein, the blockage sensor may be disposed within a mounting adapter mounted to an exterior of the air intake. The method may further include heating the blockage sensor with a heating assembly disposed at the mounting adapter.

According to another aspect of the present disclosure, an aircraft propulsion system includes an air intake and an air intake control system. The air intake includes an intake body forming an air passage. The intake body includes an air inlet duct, a core flow duct, and a bypass flow duct. The air inlet duct includes an intake inlet of the air intake. The core flow duct extends between and to the air inlet duct and a core outlet of the air intake. The bypass flow duct extends between and to the air inlet duct and a bypass outlet of the air intake. The air intake control system includes a flow control assembly and a blockage sensor assembly. The flow control assembly includes a flow control member and an actuator. The flow control member is disposed within the air intake. The actuator is operably connected to the flow control member to selectively position the flow control member to change one or both of an air flow direction or an air flow rate of an air flow through the air passage. The blockage sensor assembly includes a mounting adapter and a blockage sensor. The mounting adapter is mounted to an exterior of the intake body. The blockage sensor is mounted within the mounting adapter. The blockage sensor has a sensing area directed to the flow control member. The blockage sensor is configured to measure an accumulation of foreign matter on the flow control member within the sensing area.

In any of the aspects or embodiments described above and herein, the flow control member may include an inflatable boot. The actuator may include a fluid regulator connected in fluid communication with the inflatable boot. The fluid regulator may be configured to control the inflatable boot in at least an inflated condition and a deflated condition.

In any of the aspects or embodiments described above and herein, the inflatable boot may be disposed within the bypass flow duct.

In any of the aspects or embodiments described above and herein, the inflatable boot may be disposed within the air inlet duct.

In any of the aspects or embodiments described above and herein, the intake body may include a splitter disposed between the core flow duct and the bypass flow duct. The inflatable boot may be disposed at the splitter.

The present disclosure, and all its aspects, embodiments and advantages associated therewith will become more readily apparent in view of the detailed description provided below, including the accompanying drawings.

DESCRIPTION OF THE DRAWINGS

FIG. 9 illustrates a perspective view of a mounting adapter for an air intake blockage sensor assembly, in accordance with one or more embodiments of the present disclosure.

FIG. 10 illustrates a cutaway, side view of the air intake blockage sensor assembly, in accordance with one or more embodiments of the present disclosure.

FIG. 11 illustrates a cutaway view of a portion of the mounting adapter, in accordance with one or more embodiments of the present disclosure.

DETAILED DESCRIPTION

Figure 1:
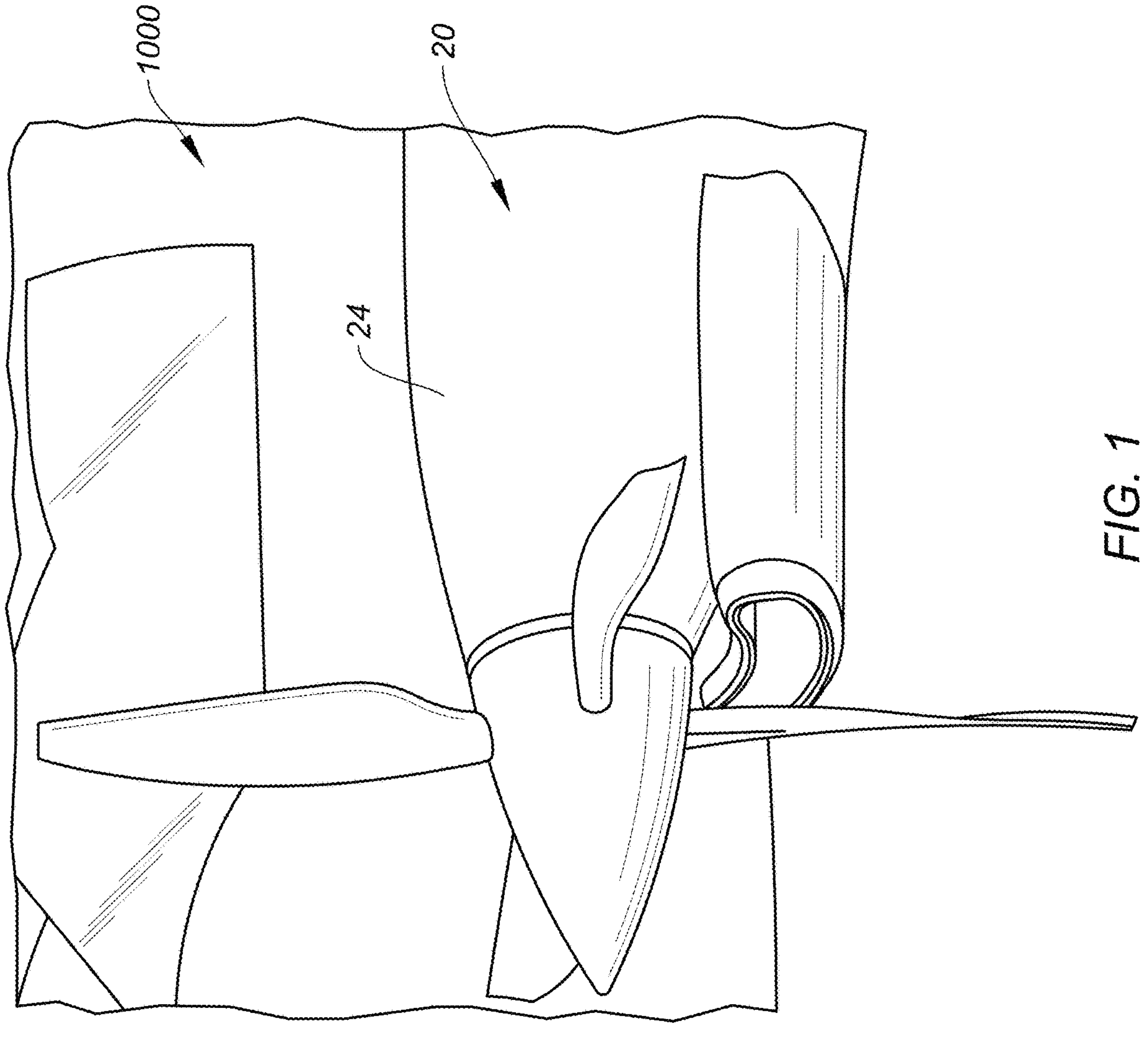
FIG. 1 schematically illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
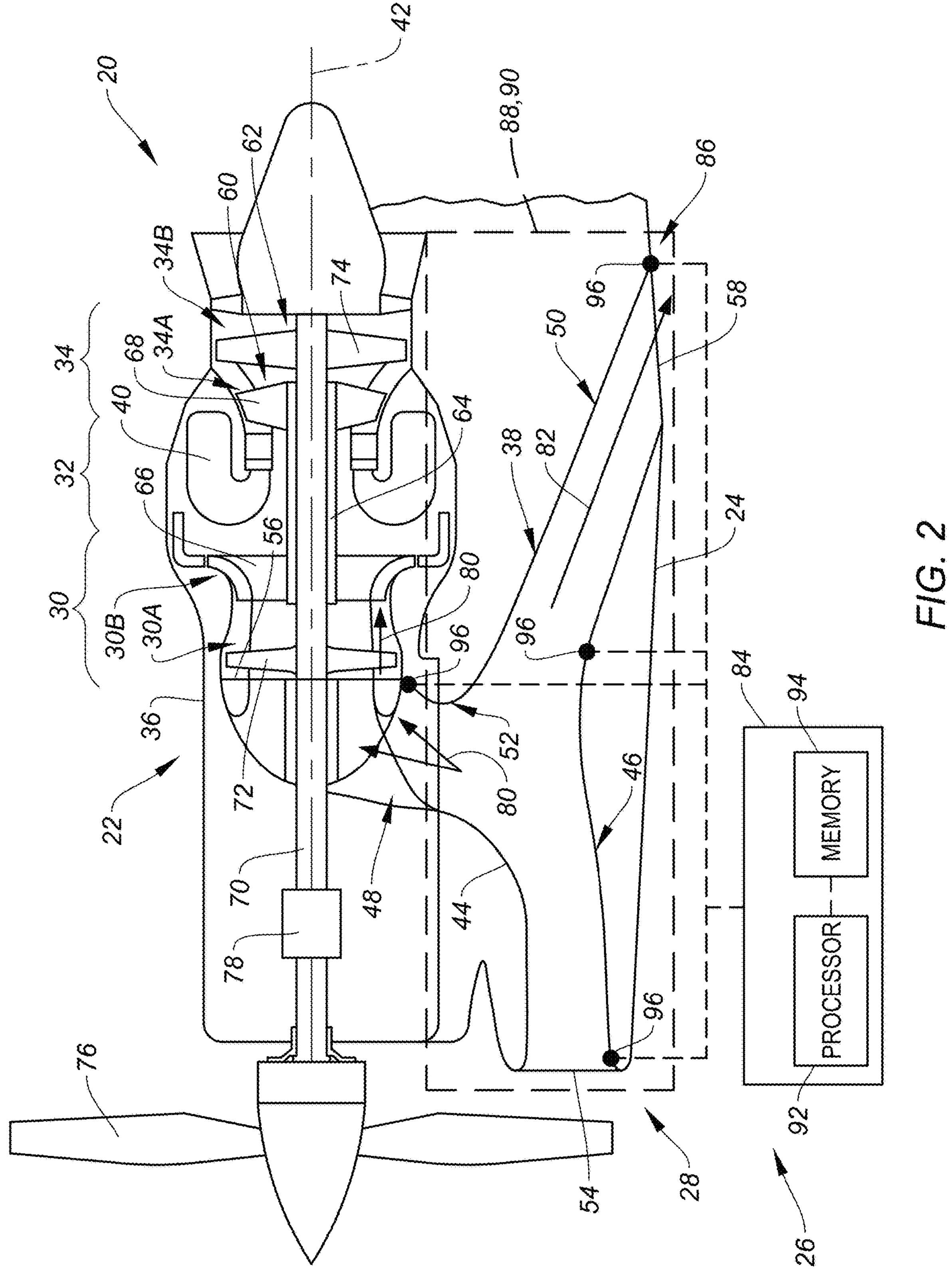
FIG. 2 schematically illustrates a cutaway, side view of a propulsion system for an aircraft, in accordance with one or more embodiments of the present disclosure.

FIG. 2 schematically illustrates a cutaway, side view of the propulsion system 20. The propulsion system 20 of FIGS. 1 and 2 includes an engine 22, a nacelle 24, and an air intake control system 26. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Moreover, the present disclosure is not limited to propulsion systems including a gas turbine engine. For example, the engine 22 may alternatively be configured as an intermittent combustion engine such as, but not limited to, a rotary engine (e.g., a Wankel engine), a piston engine, or the like.

The engine 22 of FIG. 2 includes an air inlet section 28, a compressor section 30, a combustor section 32, a turbine section 34, and an engine static structure 36. The air inlet section includes an air intake 38. The compressor section 30 includes a low-pressure compressor (LPC) section 30A and a high-pressure compressor (HPC) section 30B. The combustor section 32 includes a combustor 40 (e.g., an annular combustor). The turbine section 34 includes a high-pressure turbine (HPT) section 34A and a low-pressure turbine (LPT) section 34B.

The engine 22 sections 30, 32, and 34 of FIG. 2 are arranged sequentially along a rotational axis 42 (e.g., an axial centerline) of the engine 22. The engine static structure 36 may include, for example, one or more engine cases for the engine 22. The engine static structure 36 may additionally include cowlings, bearing assemblies, or other structural components of the engine 22. Components of the engine static structure 36 house, rotationally support, and/or structurally support components of the engine sections 28, 30, 32, and 34. The engine sections 30, 32, and 34 may be collectively referred to as an "engine core" of the engine 22.

The air intake 38 is configured to direct a flow of ambient air into the engine core of the engine 22. The air intake 38 of FIG. 2 includes an intake body 44. The intake body 44 forms a series of air passages through the air intake 38. The intake body 44 of FIG. 2 forms an air inlet duct 46, a core flow duct 48, and a bypass flow duct 50. The intake body 44 may additionally form a core-bypass splitter 52.

The air inlet duct 46 forms an intake inlet 54 of the air intake 38. The air inlet duct 46 and its intake inlet 54 may be disposed outside of the engine 22 and may be formed by, disposed within, or otherwise in contact with the nacelle 24. For example, the intake inlet 54 of FIG. 2 is radially offset (e.g., entirely radially offset) from the rotational axis 42.

The core flow duct 48 forms a core outlet 56 of the air intake 38. The core outlet 56 of FIG. 2 is disposed at (e.g., on, adjacent, or proximate) the compressor section 30 to direct ambient air entering the air intake 38 into the compressor section 30. For example, the core outlet 56 of FIG. 2 is disposed at (e.g., on, adjacent, or proximate) and in fluid communication with an inlet of the low-pressure compressor section 30A. The core flow duct 48 extends between and to the air inlet duct 46 and the core outlet 56.

The bypass flow duct 50 forms a bypass outlet 58 of the air intake 38. The bypass flow duct 50 and its bypass outlet 58 may be disposed outside of the engine 22 and may be formed by, disposed within, or otherwise in contact with the nacelle 24. For example, the bypass outlet 58 may be disposed at (e.g., on, adjacent, or proximate) or otherwise formed through an exterior surface of the nacelle 24 to direct air from the air intake 38 to an exterior of the propulsion system 20. The bypass flow duct 50 extends between and to the air inlet duct 46 and the bypass outlet 58.

The splitter 52 is disposed between (e.g., radially between) and separates the core flow duct 48 and the bypass flow duct 50. For example, the splitter 52 may form a radially outer boundary of the core flow duct 48 and a radially inner boundary of the bypass flow duct 50. The splitter 52 forms a leading edge (e.g., an axially forward-most edge) of the intake body 44 between the core flow duct 48 and the bypass flow duct 50.

The engine 22 of FIG. 2 further includes a first rotational assembly 60 (e.g., a high-pressure spool) and a second rotational assembly 62 (e.g., a low-pressure spool). The first rotational assembly 60 and the second rotational assembly 62 are mounted for rotation about the rotational axis 42 relative to the engine static structure 36.

The first rotational assembly 60 includes a first shaft 64, a bladed first compressor rotor 66 for the high-pressure compressor section 30B, and a bladed first turbine rotor 68 for the high-pressure turbine section 34A. The first shaft 64 interconnects the bladed first compressor rotor 66 and the bladed first turbine rotor 68.

The second rotational assembly 62 includes a second shaft 70, a bladed second compressor rotor 72 for the low-pressure compressor section 30A, and a bladed second turbine rotor 74 for the low-pressure turbine section 34B. The second shaft 70 interconnects the bladed second compressor rotor 72 and the bladed second turbine rotor 74. The second shaft 70 operably connects (e.g., directly or indirectly connects) the bladed second turbine rotor 74 with a propulsor 76 (e.g., a propeller) of the propulsion system 20. As shown in FIG. 2, for example, the second shaft 70 may be coupled with the propulsor 76 by a gear box 78. The gear box 78 may include a reduction gear assembly (e.g., an epicyclic gear assembly) configured to drive the propulsor 76 at a reduced rotational speed relative to the second shaft 70. Of course, the second shaft 70 may alternatively be directly connected to the propulsor 76 to drive the propulsor 76 at the same rotational speed as the second shaft 70.

The nacelle 24 houses the engine 23 and forms and aerodynamic cover for the propulsion system 20. The nacelle 24 may surround and/or support portions of the air intake 38.

During operation of the propulsion system 20, ambient air enters the propulsion system 20 through the air intake 38 (e.g., the air inlet duct 46) and is separated and directed into the core flow duct 48 along a core flow path 80 and the bypass flow duct 50 along a bypass flow path 82. Air flow along the core flow path 80 ("core air") is directed into the compressor section 30 where it is compressed in the low-pressure compressor section 30A and the high-pressure compressor section 30B, and then directed into a combustion chamber of the combustor 40. Fuel is injected into the combustion chamber and mixed with the compressed core air to provide a fuel-air mixture. This fuel-air mixture is ignited and combustion products thereof ("core combustion gas") sequentially flow through the high-pressure turbine section 34A and the low-pressure turbine section 34B. Air flow along the bypass flow path 82 ("bypass air") is directed through the bypass flow duct 50 and exhausted from the propulsion system 20. The bypass duct 50 may facilitate inertial separation of foreign matter entering the air intake 38 to prevent the foreign matter from being directed into the engine 22 (e.g., the compressor section 30). For example, foreign matter entering the air inlet duct 46 may be unable to be carried by air flow into the core flow duct 48, and the foreign matter may instead be directed into the bypass flow duct 50 and exhausted from the propulsion assembly 20.

The control system 26 includes a controller 84. The control system 26 may additionally include an air flow sensor assembly 86 and/or one or more flow control assemblies 88. The control system 26 includes at least one air intake blockage sensor assembly 90.

The controller 84 is connected in signal communication with the air intake blockage sensor assembly 90. The controller 84 may additionally be connected in signal communication with the air flow sensor assembly 86 and/or the flow control assemblies 88. The controller 84 includes a processor 92 connected in signal communication with memory 94.

The processor 92 may include any type of computing device, computational circuit, processor(s), central processing unit (CPU), graphics processing unit (GPU), computer, or the like capable of executing a series of instructions that are stored in the memory 94. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the controller 84 to accomplish the same algorithmically and/or coordination of control system 26 components. The memory 94 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly and/or indirectly coupled to the controller 84. The controller 84 may include, or may be in communication with, a user interface including one or more inputs devices and/or one or more output devices, for example, an input device that enables a user to enter data and/or instructions and an output device configured to display information (e.g., a visual display or a printer), or to transfer data, etc. Communications between the controller 84 and external electrical or electronic devices may be via a hardwire connection or via a wireless connection. A person of skill in the art will recognize that portions of the controller 84 may assume various forms (e.g., digital signal processor, analog device, etc.) capable of performing the functions described herein.

The controller 84 may form or otherwise be part of an electronic engine controller (EEC) for the propulsion system 20. The EEC may control operating parameters of the engine 22 including, but not limited to, fuel flow, stator vane position (e.g., variable compressor inlet guide vane (IGV) position), compressor air bleed valve position, propeller blade pitch, etc. so as to control an engine power and/or thrust of the engine 22. In some embodiments, the EEC may be part of a full authority digital engine control (FADEC) system for the propulsion system 20.

The air flow sensor assembly 86 may include one or more sensors 96 configured to measure air flow conditions (e.g., air flow rate, air temperature, and other air flow condition parameters) within the air intake 38. Examples of the sensors 96 include, but are not limited to, air pressure sensors, air flow sensors, air temperature sensors, and the like. The sensors 96 may be disposed at one or more locations within the air intake 38.

Figures 3, 4:
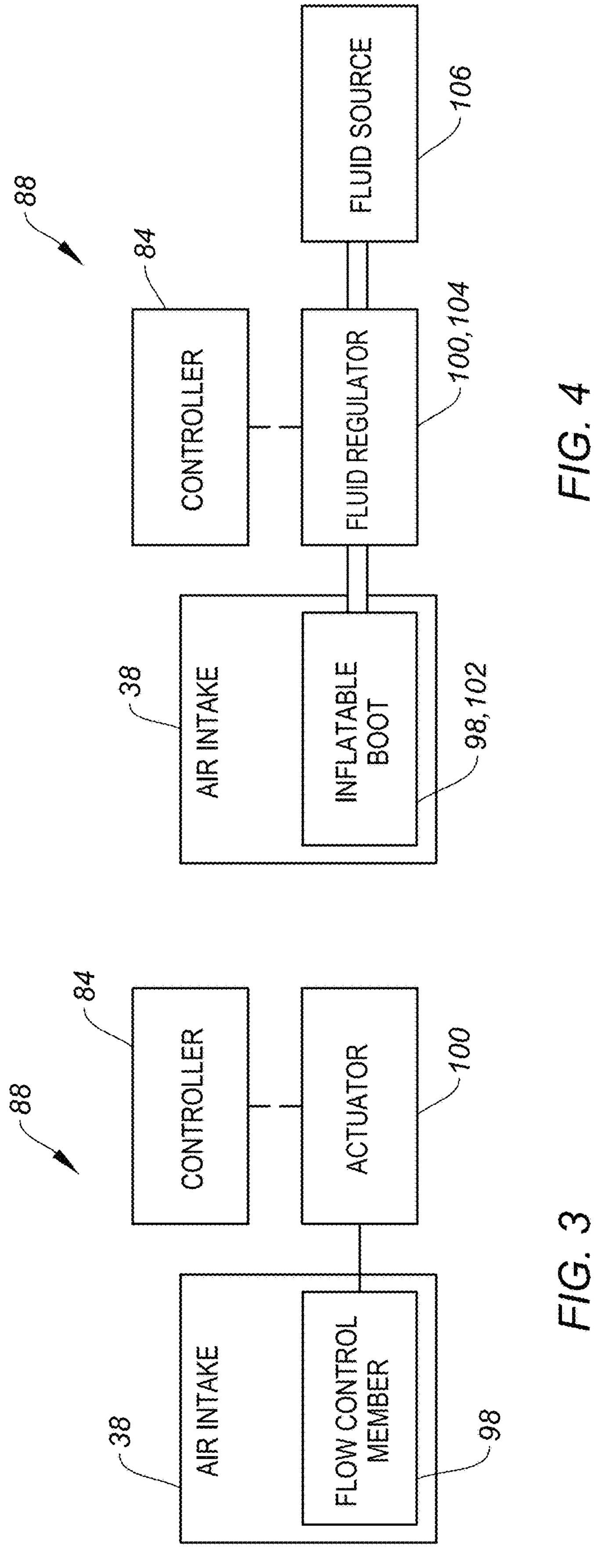
FIG. 3 schematically illustrates a flow control assembly for an air intake of an aircraft propulsion system, in accordance with one or more embodiments of the present disclosure.
FIG. 4 schematically illustrates another flow control assembly for an air intake of an aircraft propulsion system, in accordance with one or more embodiments of the present disclosure.

FIG. 3 schematically illustrates the flow control assembly 88. The flow control assembly 88 of FIG. 3 includes a flow control member 98 and an actuator 100. The flow control member 98 is a body disposed within the air intake 38 and selectively movable to change an air flow direction and/or an air flow rate of air within all or a portion of the air intake 38. For example, the flow control member 98 may be formed by or otherwise include a moveable body such as, but not limited to, a door, a damper, an inflatable boot, a valve, or the like. The actuator 100 (e.g., a hydraulic actuator, a pneumatic actuator, an electro-mechanical actuator, etc.) is operably connected to the flow control member 98 and configured to selectively move the flow control member 98 to facilitate control of the air flow direction and/or the air flow rate of air within all or a portion of the air intake 38. The actuator 100 is connected in communication (e.g., electrical and/or signal communication) with the controller 84 to facilitate control of the flow control member 98 movement by the controller 84 using the actuator 100.

FIG. 4 schematically illustrates an embodiment of the air flow assembly 88 in which the flow control member 98 includes an inflatable boot 102 (e.g., an elastomeric bladder) and the actuator 100 includes a fluid regulator 104. The inflatable boot 102 is disposed at (e.g., on, adjacent, or proximate) the air intake 38 and within the air intake 38, for example, within one or more of the air inlet duct 46, the core flow duct 48, or the bypass flow duct 50 (see FIG. 2). The inflatable boot 102 is selectively deformable, by operation of the fluid regulator 104, to alter an internal geometry of the air intake 38, thereby altering an air flow direction and/or an air flow rate of air within all or a portion of the air intake 38. The inflatable boot 102 is positionable (e.g., inflatable) in an inflated condition (e.g., a fully inflated condition), a deflated condition (e.g., a fully deflated condition), or a plurality of partially inflated conditions to vary a size and/or shape of the inflatable boot 102. The fluid regulator 104 is connected in fluid communication with the inflatable boot 102 to direct a fluid (e.g., air) into or out of the inflatable boot 102 to control a state (e.g., a position, a size, a shape, etc.) of the inflatable boot 102. The fluid regulator 104 is further connected in fluid communication with a pressurized fluid source 106. The pressurized fluid source 106 may include, for example, a stage of the low-pressure compressor section 30A or the high-pressure compressor section 30B (see FIG. 2). For example, the low-pressure compressor section 30A or the high-pressure compressor section 30B may be configured to supply pressurized bleed air to the fluid regulator 104. The fluid regulator 104 may include one or more components such as, but not limited to, flow control valves (e.g., spring-loaded control valves), pressure-relief valves, fluid vents, pressure sensors, and the like so as to direct and control a supply of fluid to or from the inflatable boot 102. The present disclosure, however, is not limited to any particular configuration of the fluid regulator 104.

FIGS. 5-8 illustrate various embodiments of the flow control assembly 88 for the air intake 38. The various embodiments of the flow control assembly 88 may be incorporated into the air intake 38 separately (e.g., as shown in FIGS. 5-8) or in combination (e.g., two or more different flow control assemblies 88 may be used in a single air intake 38). The present disclosure, however, is not limited to the foregoing exemplary configurations of the flow control assembly 88 or its flow control member 98 (e.g., the inflatable boot 102).

Figures 5A, 5B, 5C:
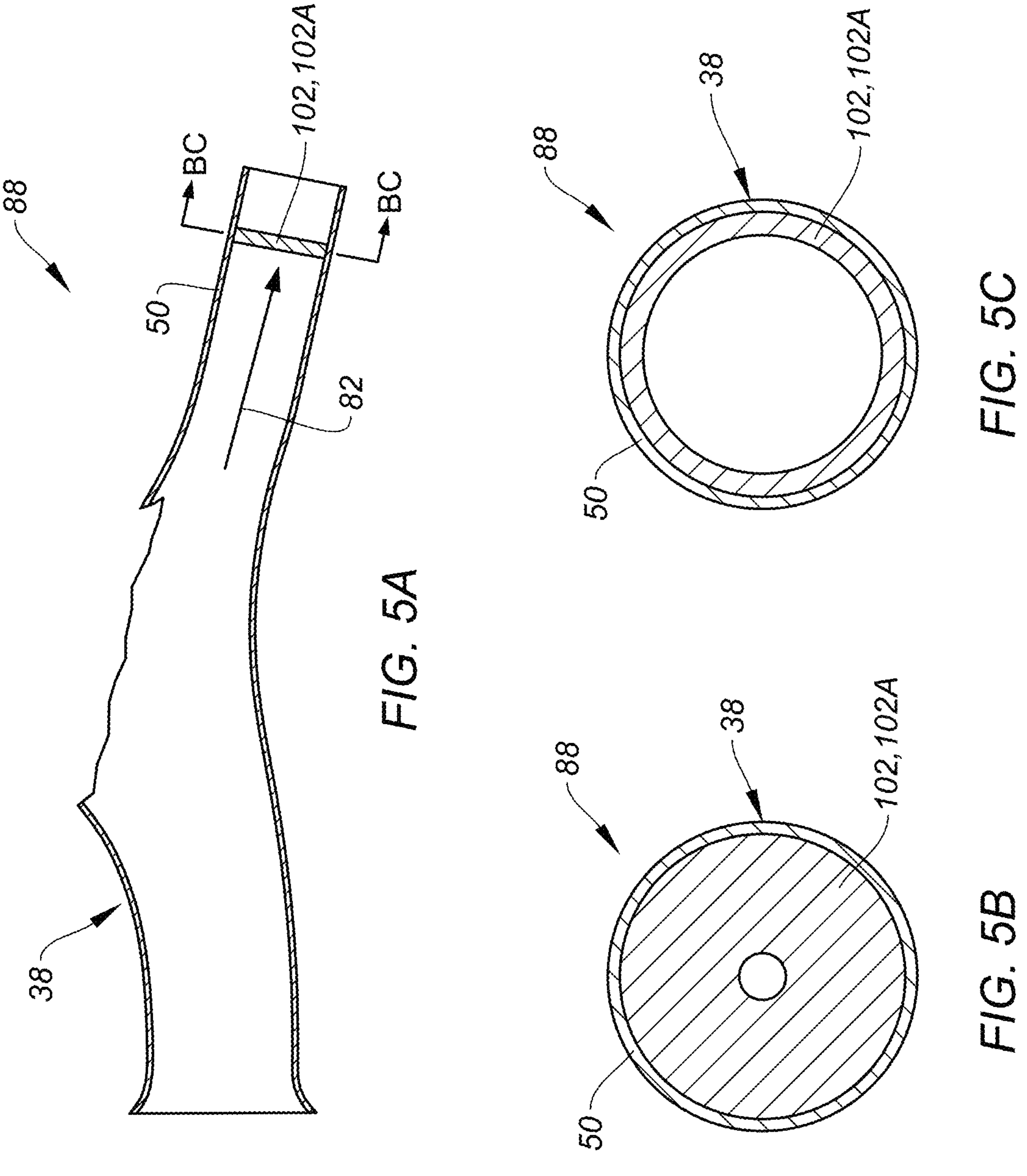
FIGS. 5A-C schematically illustrate another flow control assembly for an air intake of an aircraft propulsion system, in accordance with one or more embodiments of the present disclosure.

FIGS. 5A-C illustrate an embodiment of the flow control assembly 88. FIG. 5A schematically illustrates a cutaway, side view of the air intake 38 and the flow control assembly

88 (e.g., an inflatable boot 102, 102A). FIGS. 5B and 5C schematically illustrate cross-sectional views of the air intake 38 and the inflatable boot 102A taken along Line BC of FIG. 5A with the inflatable boot 102A in the inflated condition (FIG. 5B) and the deflated condition (FIG. 5C). The inflatable boot 102A of FIGS. 5A-C is disposed at (e.g., on, adjacent, or proximate) and within the bypass flow duct 50 to selectively control a flow area (e.g., a cross-sectional flow area) of the bypass flow path 82. The inflatable boot 102A may be configured as a ring circumscribing the bypass flow path 82 along a portion of the bypass flow duct 50. The inflatable boot 102A is positionable (e.g., inflatable) in the inflated condition, the deflated condition, or the plurality of partially inflated conditions to control a size of the flow area of the bypass flow path 82 through the inflatable boot 102A. During operation of the engine 22, the inflatable boot 102A of FIGS. 5A-C may be placed (e.g., inflated by the fluid regulator 104; see FIG. 4) in the inflated condition to direct a greater proportion of air entering the air intake 38 (e.g., the air inlet duct 46) into the core flow duct 48 and a smaller proportion of air entering the air intake 38 into the bypass flow duct 50, thereby facilitating improved engine 22 performance (e.g., during cruising conditions) (see FIGS. 2 and 4). During some other operating conditions of the engine 22, such as icing conditions, the inflatable boot 102A of FIGS. 5A-C may be placed (e.g., deflated by the fluid regulator 104) in the deflated condition to facilitate improved inertial separation of foreign matter (e.g., ice) into the bypass flow duct 50 and away from the core flow duct 48.

Figure 6B:
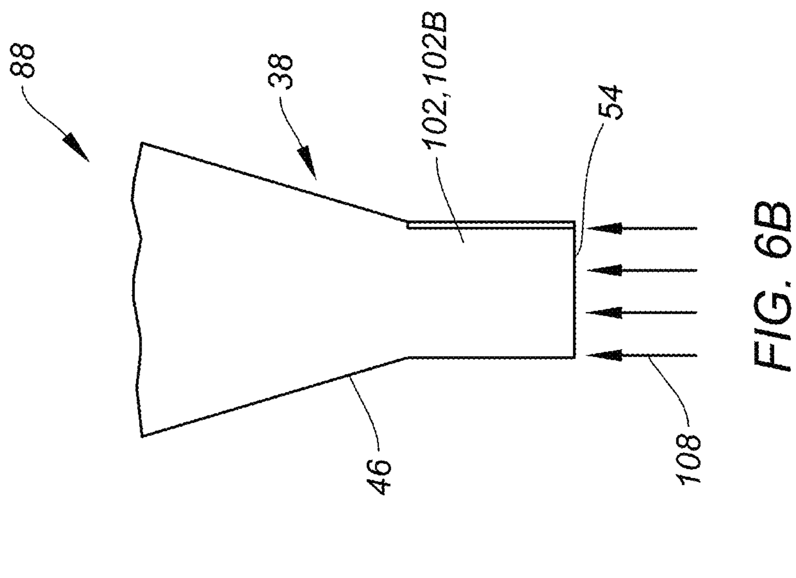
FIGS. 6A-B schematically illustrate another flow control assembly for an air intake of an aircraft propulsion system, in accordance with one or more embodiments of the present disclosure.
Figure 6A:
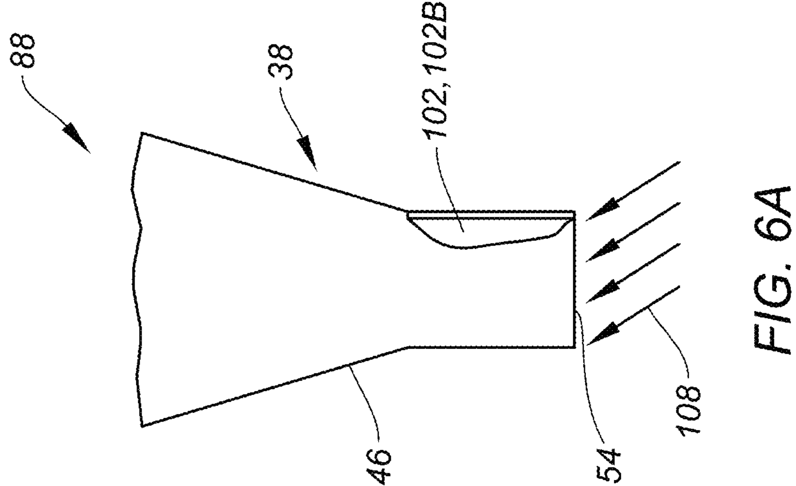

FIGS. 6A-B illustrate another embodiment of the flow control assembly 88. FIG. 6A schematically illustrates a cutaway, top view of the air intake 38 and an inflatable boot 102, 102B with the inflatable boot 102B in the inflated condition. FIG. 6B schematically illustrates a cutaway, top view of the air intake 38 and the inflatable boot 102B with the inflatable boot 102B in the deflated condition. The inflatable boot 102B of FIGS. 6A-B is disposed at (e.g., on, adjacent, or proximate) the intake inlet 54. In the inflated condition, the inflatable boot 102B forms an asymmetric shape of the intake inlet 54. As shown in FIG. 6A, the ambient air 108 may flow in a direction which is misaligned with the orientation of the air inlet duct 46, for example, as a result of prop wash, wind, aircraft maneuvering, etc. The inflatable boot 102B in the inflated condition facilitates straightening of the ambient air 108 entering the intake inlet 54, thereby improving air flow characteristics into and through the air intake 38. In operating conditions in which the ambient air 108 is aligned with or substantially aligned with the orientation of the air inlet duct 46, the inflatable boot 102B may be positioned in the deflated condition, as shown in FIG. 6B.

Figure 7B:
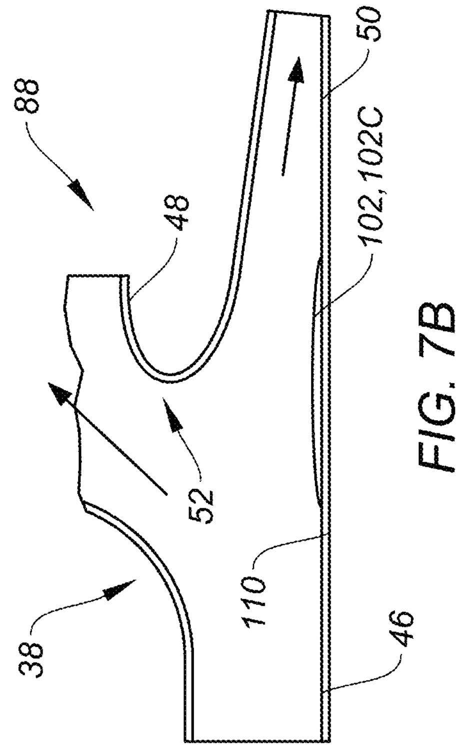
FIGS. 7A-B schematically illustrate another flow control assembly for an air intake of an aircraft propulsion system, in accordance with one or more embodiments of the present disclosure.
Figure 7A:
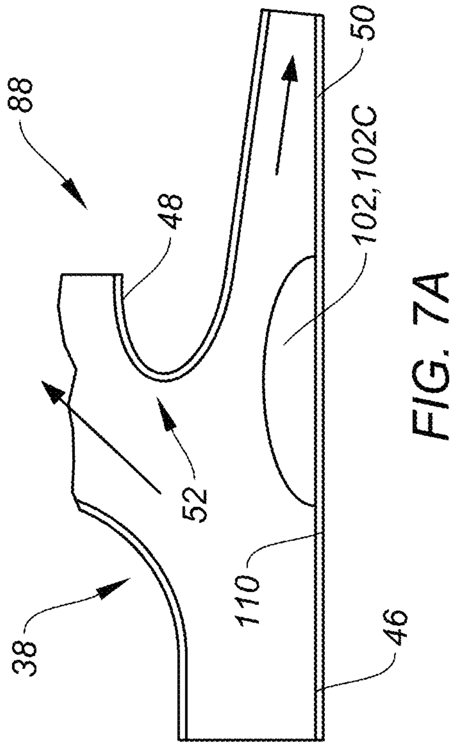

FIGS. 7A-B illustrate another embodiment of the flow control assembly 88. FIG. 7A schematically illustrates a cutaway, side view of the air intake 38 and an inflatable boot 102, 102C with the inflatable boot 102C in the inflated condition. FIG. 7B schematically illustrates a cutaway, side view of the air intake 38 and the inflatable boot 102C with the inflatable boot 102C in the deflated condition. The inflatable boot 102C of FIGS. 7A-B is disposed on a gas path floor 110 of the air intake 38. For example, the inflatable boot 102C may be disposed on the gas path floor 110 at an axial position of the splitter 52. The gas path floor 110 is formed by a portion of the air intake 38 extending along the air inlet duct 46 and the bypass flow duct 50 and facing the core flow duct 48 and the splitter 52. The gas path floor 110 may have a flat or substantially flat orientation (e.g., in the axial direction). This flat orientation of the gas path floor 110 may contribute to flow separation of air flowing into and through the bypass flow duct 50, thereby contributing to pressure loss and flow distortion within the air intake 38 (e.g., reduced air intake efficiency). During operation of the engine 22, the inflatable boot 102C of FIGS. 7A-B in the inflated condition may reduce flow separation of air flowing into and through the bypass flow duct 50, thereby facilitating improved engine 22 performance (e.g., during cruising conditions) (see FIG. 2). During some other operating conditions of the engine 22, such as icing conditions, the inflatable boot in the deflated condition may facilitate improved inertial separation of foreign matter (e.g., ice) into the bypass flow duct 50 and away from the core flow duct 48.

Figures 8A, 8B:
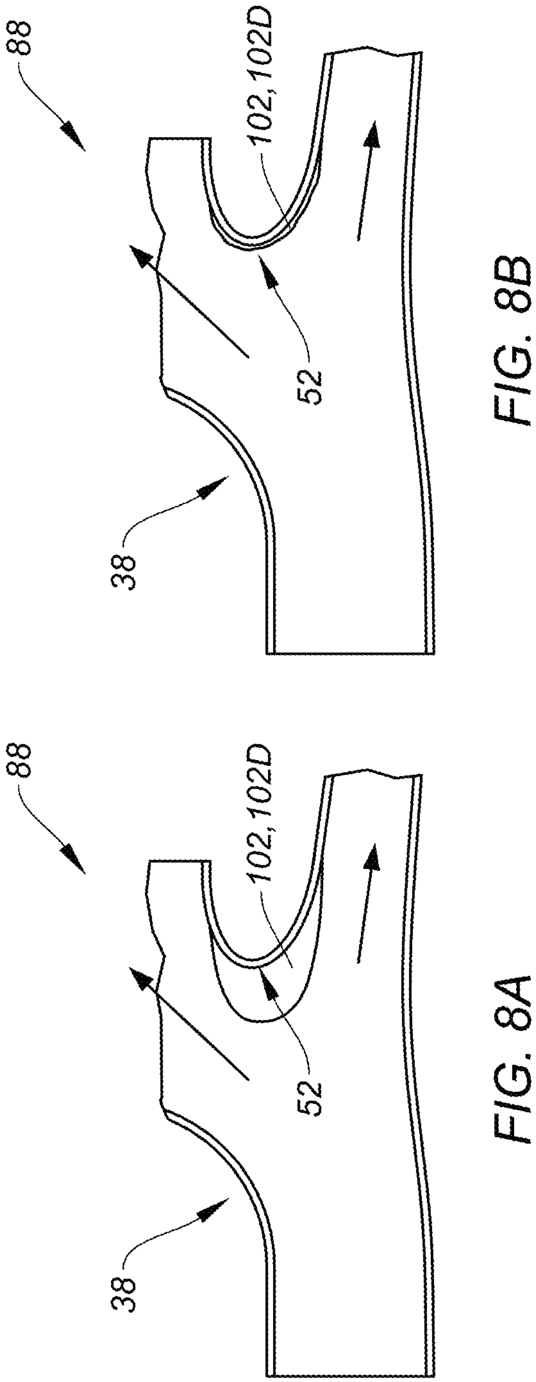
FIGS. 8A-B schematically illustrate another flow control assembly for an air intake of an aircraft propulsion system, in accordance with one or more embodiments of the present disclosure.

FIGS. 8A-B illustrate another embodiment of the flow control assembly 88. FIG. 8A schematically illustrates a cutaway, side view of the air intake 38 and an inflatable boot 102, 102D with the inflatable boot 102D in the inflated condition. FIG. 8B schematically illustrates a cutaway, side view of the air intake 38 and the inflatable boot 102D with the inflatable boot 102D in the deflated condition. The inflatable boot 102D of FIGS. 8A-B is disposed at (e.g., on, adjacent, or proximate) the splitter 52. During operation of the engine 22, the inflatable boot 102D of FIGS. 8A-B in the inflated condition facilitate improved inertial separation of foreign matter into the bypass flow duct 50 while the inflatable boot 102D in the deflated condition may facilitate improved air intake 38 efficiency (see FIG. 2).

During operation of the propulsion system 20, foreign matter such as, but not limited to, water, ice, sand, hail, and other debris may enter the air intake 38 with ambient air and may accumulate on interior surfaces of the air intake 38 (e.g., the intake body 44) and/or the flow control member 98. The accumulation of foreign matter (typically ice) within the air intake 38 may reduce the interior air flow area of the air intake 38 or otherwise disrupt the efficient flow of air through all or portions of the air intake 38. Moreover, the accumulation of foreign matter on the flow control member 98 may inhibit the operation (e.g., movement) of the flow control member 98.

FIGS. 9 and 10 illustrate the blockage sensor assembly 90. The blockage sensor assembly 90 of FIGS. 9 and 10 includes a mounting adapter 112 and a sensor 114. FIG. 9 illustrates a perspective view of the mounting adapter 112. FIG. 10 illustrates a cutaway, side view of the blockage sensor assembly 90 with the sensor 114 installed in the mounting adapter 112.

The mounting adapter 112 includes an adapter body 116. The adapter body 116 extends between and to an inner side 118 of the adapter body 116 and an outer side 120 of the adapter body 116. The adapter body 116 includes a duct mounting portion 122 and a sensor mounting portion 124. The duct mounting portion 122 is disposed at (e.g., on, adjacent, or proximate) the inner side 118. The duct mounting portion 122 forms or otherwise includes a flange 126. The duct mounting portion 122 (e.g., the flange 126) forms an inner mounting surface 128 extending along the inner side 118. The inner mounting surface 128 may be substantially flat (e.g., planar) as shown, for example, in FIG. 10. The inner mounting surface 128 may alternatively be curved (e.g., to match a curvature of the intake body 44; see FIG. 2), as will be discussed in further detail below. The sensor mounting portion 124 extends between and to the duct mounting portion 122 and the outer side 120. The sensor mounting portion 124 forms or otherwise includes a flange 130. The sensor mounting portion 124 (e.g., the flange 130) forms an outer mounting surface 132. The outer mounting surface 132 may be oriented obliquely relative to the inner mounting surface 128 as shown, for example, in FIG. 10. The present disclosure, however, is not limited to any particular orientation of the outer mounting surface 132 to the inner mounting surface 128. The duct mounting portion 122 and the sensor mounting portion 124 form a sensor aperture 134. The sensor aperture 134 extends between and to the inner mounting surface 128 and the outer mounting surface 132.

The sensor 114 is configured to identify the presence or absence of foreign matter within the air intake 38. In particular, the sensor 114 is configured to identify an accumulation of obstructing foreign matter (e.g., ice) on one or more interior surfaces of the air intake 38 and/or on the flow control member 98 of one of the flow control assemblies 88. The sensor 114 may be configured as an optical sensor (e.g., a camera), a laser sensor, an ultrasonic sensor, or the like configured to measure and identify an accumulation of obstructing foreign matter at a position within the air intake 38, for example, based on a measured proximity of the obstructing foreign matter to the sensor 114. The sensor 114 extends between and to an inner end 136 of the sensor 114 and an outer end 138 of the sensor 114. A sensing feature (e.g., camera lens, laser generator, light sensor, ultrasonic transducers, etc.) of the sensor 114 is disposed at the inner end 136. The sensor 114 may further include a flange 140 disposed between the inner end 136 and the outer end 138. The sensor 114 is disposed within the sensor aperture 134. The inner end 136 may be disposed at (e.g., on, adjacent, or proximate) the inner side 118. Alternatively, the sensor 114 may extend through the sensor aperture 134 on the inner side 118 and project inward from the inner side 118 such that the inner end 136 is spaced inward from the inner side 118. The flange 140 may be mounted (e.g., by one or more mechanical fasteners) to the flange 130 along the outer mounting surface 132. The sensor 114 may be connected in signal communication with the controller 84 at (e.g., on, adjacent, or proximate) the outer end 138 (e.g., by a hardwire connection).

Referring to FIGS. 9-11, in some embodiments, the mounting adapter 112 may include a sensor heating assembly 142. The sensor heating assembly 142 may include at least one air inlet 144 and an internal air passage 146. The air inlet 144 is formed by or otherwise disposed on the sensor mounting portion 124. The air inlet 144 is connected in fluid communication with a heated air source (e.g., compressor bleed air from the compressor section 30; see FIG. 2). The air inlet 144 is further connected in fluid communication with the internal air passage 146. The internal air passage 146 is formed by and within the adapter body 116 (e.g., the sensor mounting portion 124). As shown in FIG. 11, the internal air passage 146 may be an annular air passage extending circumferentially about the sensor aperture 134 and the sensor 114. The present disclosure, however, is not limited to the foregoing exemplary configuration of the internal air passage 146 shown in FIG. 11. The internal air passage 146 may be connected in fluid communication with the sensor aperture 134. For example, the internal air passage 146 may directed heated air from the air inlet 144 into the sensor aperture 134 to heat the sensor 114 (e.g., during icing conditions). The sensor heating assembly 142 of the present disclosure is not limited to the use of heated air for heating the sensor 114. For example, the sensor heating assembly 142 may alternatively be configured to apply electric resistive heating to the sensor 114.

Figure 12:
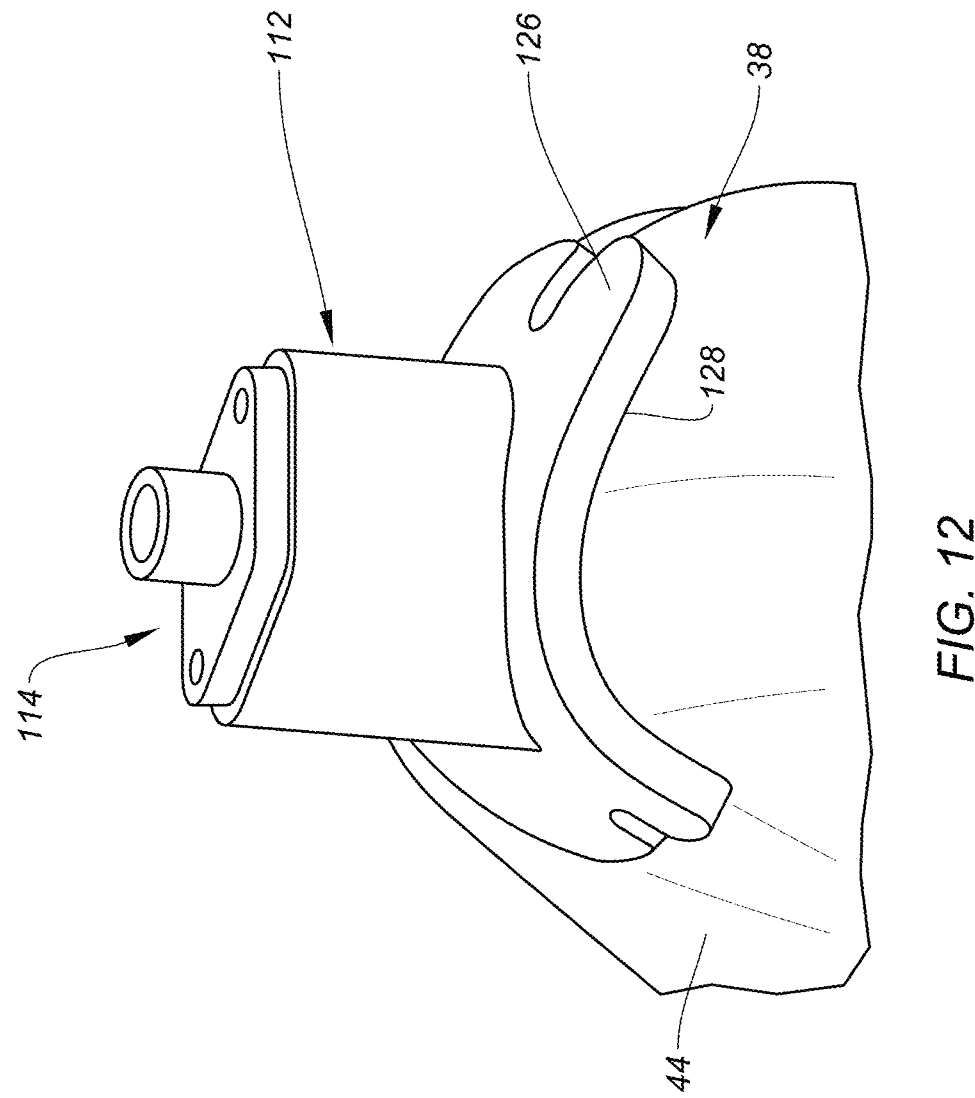
FIG. 12 illustrates a mounting adapter of an air intake blockage sensor assembly mounted on an air intake of an aircraft propulsion system, in accordance with one or more embodiments of the present disclosure.

Referring briefly to FIG. 12, the flange 126 and its inner mounting surface 128 may have a curved shape corresponding to a respective curved shape of an exterior of the air intake 38 (e.g., the intake body 44) to facilitate securely mounting the mounting adapter 112 to the air intake 38. The flange 126 may be mounted to the intake body 44, for example, by one or more mechanical fasteners. Alternatively, the flange 126 may be mounted to the intake body 44 by bonding, welding, or another suitable attachment configuration. In some embodiments, the mounting adapter 112 (e.g., the adapter body 116) and the air intake 38 (e.g., the intake body 44) may be formed as a unitary component. The term "unitary component" as used herein means a single component, wherein the intake body 44 and the adapter body 116 are an inseparable body (e.g., formed of a single material).

Figures 13A, 13B, 13C, 13D, 13E:
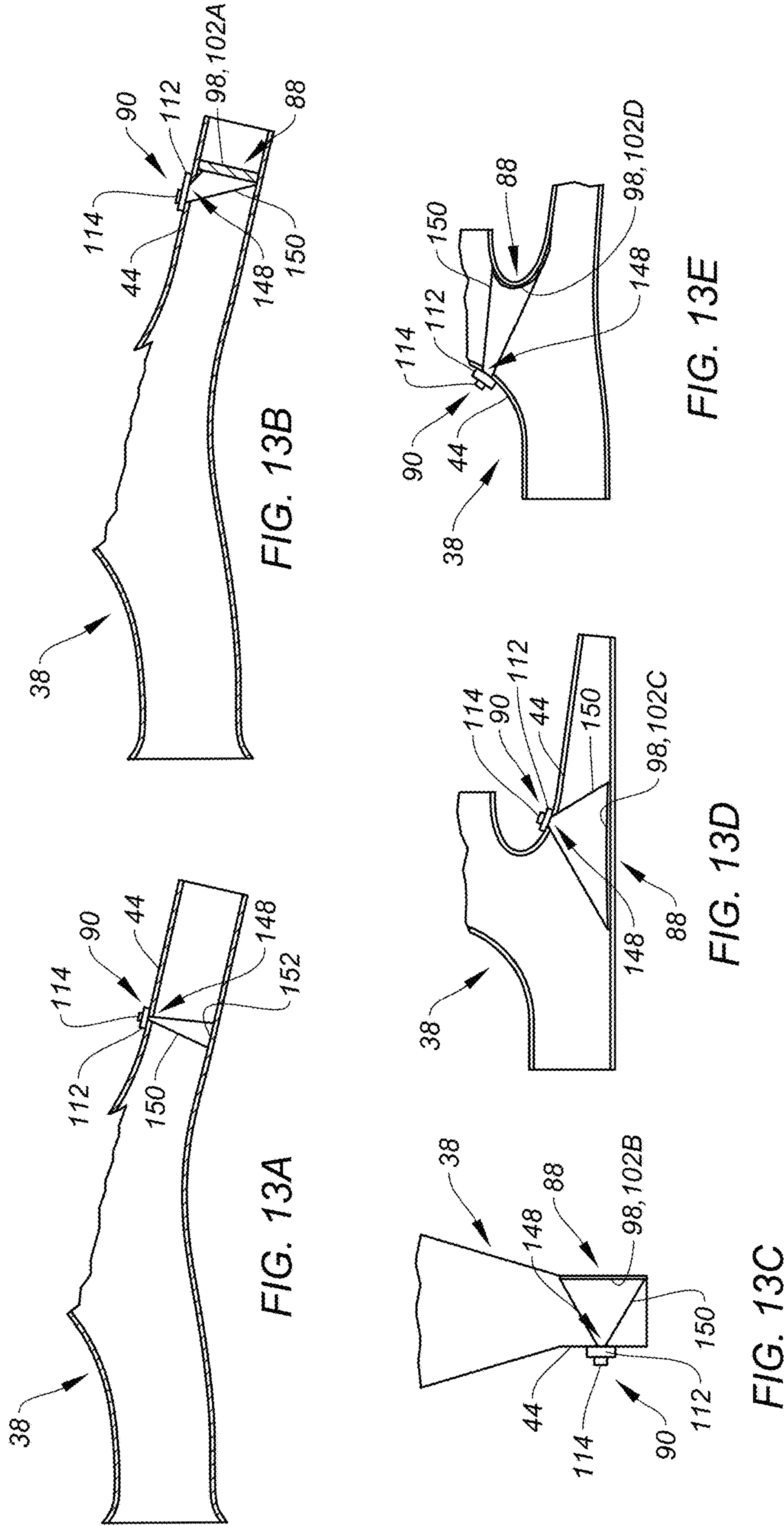
FIGS. 13A-E schematically illustrate cutaway, side views of the air intake blockage sensor assembly for various flow control assemblies for an air intake of an aircraft propulsion system, in accordance with one or more embodiments of the present disclosure.

FIGS. 13A-E illustrate various exemplary configurations of the blockage sensor assembly 90 for the air intake 38 and/or the flow control assemblies 88. The blockage sensor assembly 90 is mounted on the air intake 38 (e.g., an exterior of the intake body 44). The blockage sensor assembly 90 may be mounted on the intake body 44 coincident with a sensor aperture 148 formed through the intake body 44. For example, the mounting adapter 112 may be mounted to the intake body 44 (e.g., by the flange 126; see FIGS. 9 and 10) so as to position the sensor 114 (e.g., the inner end 136; see FIG. 10) at (e.g., on, adjacent, or proximate) the sensor aperture 148. The sensor 114 is positioned sensing area 150 (e.g., a field-of-view) directed toward a portion of the air intake 38 and/or the flow control member 98 of one of the flow control assemblies 88. The sensor 114 of FIG. 13A is positioned with the sensing area 150 directed to an interior surface 152 of the intake body 44. The control system 26 may include a plurality of blockage sensor assemblies 90 to facilitate blockage sensing of multiple portions (e.g., interior surfaces) of the intake body 44. The sensors 114 of FIGS. 13B-E configured to identify accumulated foreign matter on the flow control member 98. For example, the sensors 114 of FIGS. 13B-E are positioned with their sensing areas 150 directed to the inflatable boots 102A-D, respectively. The controller 84 may generate a warning (e.g., a warning light, a warning message, an audible alarm, etc.) for a pilot or other operator of the aircraft 1000 (see FIG. 1) in response to identification of the accumulated foreign matter by the sensor 114.

Figure 14:
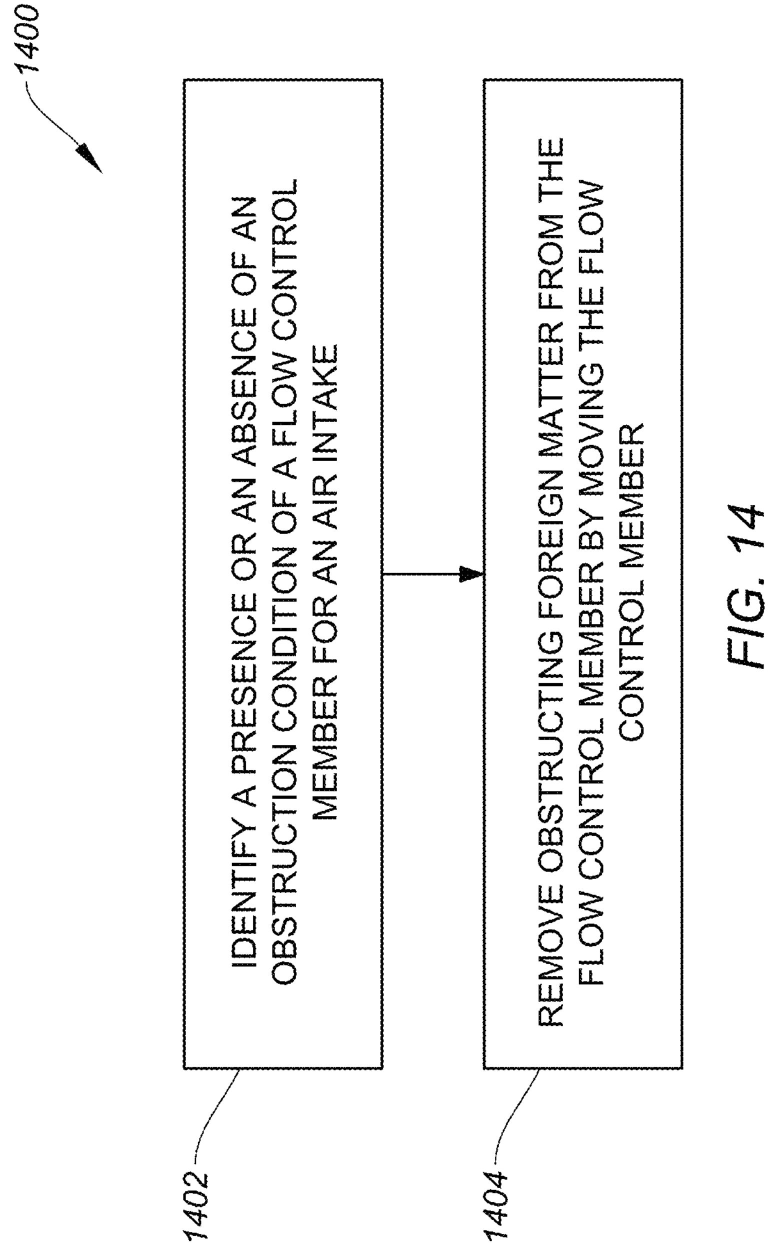
FIG. 14 illustrates a block diagram depicting a method for removing obstructing foreign matter from a flow control assembly for an air intake of an aircraft propulsion system, in accordance with one or more embodiments of the present disclosure.
Figure 15C:
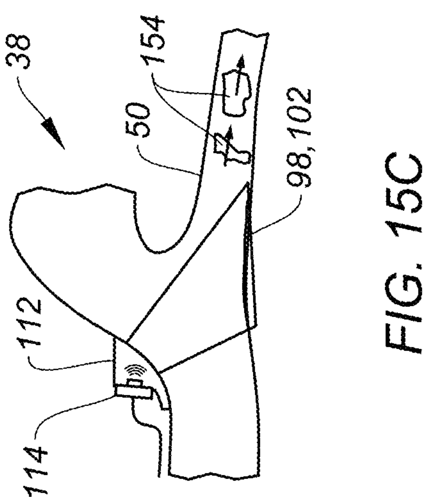
FIGS. 15A-C schematically illustrate cutaway, side views of an air intake for an aircraft propulsion system depicting a sequence of removing obstructing foreign matter from a flow control assembly for the air intake, in accordance with one or more embodiments of the present disclosure.

Referring to FIGS. 2, 14, and 15, a method 1400 for removing obstructing foreign matter from a flow control assembly for an air intake of an aircraft propulsion system. FIG. 14 illustrates a flowchart for the method 1400. FIG. 15 schematically illustrates cutaway, side views of the air intake 38 depicting a sequence for removing obstructing foreign matter from the flow control assembly 88 (e.g., the flow control member 98) for the air intake 38. For ease of explanation, the method 1400 is described herein with respect to the control system 26 and the air intake 38. The present disclosure method 1400, however, is not limited to use with the control system 26 and the air intake 38 described herein. The controller 84 (e.g., the processor 92) may execute instructions stored in the memory 94, thereby causing the controller 84 (e.g., the processor 92) to control and/or perform one or more steps or portions of steps of the method 1400.

Figure 15B:
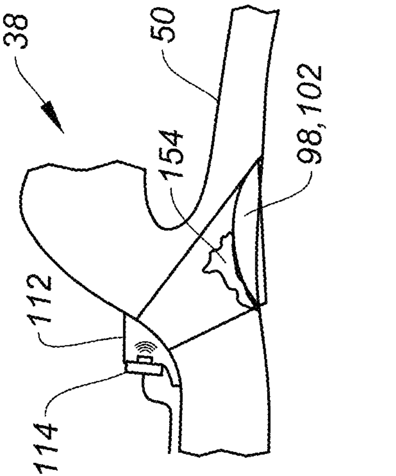
Figure 15A:
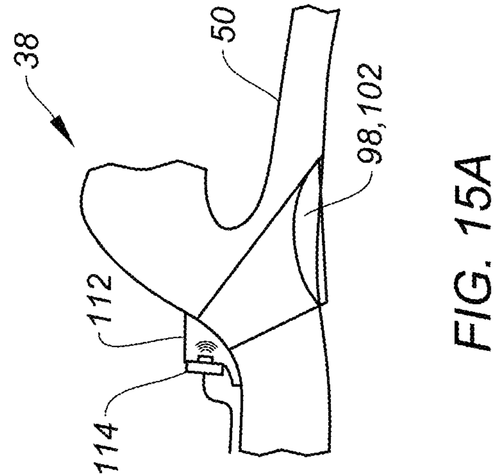

Step 1402 includes identifying a presence or an absence of an obstruction condition of the flow control member 98 (e.g., the inflatable boot 102) with the sensor 114. The controller 84 may identify the presence of the obstruction condition where an accumulation of foreign matter (e.g., ice) on the flow control member 98 is greater than an accumulation threshold, for example, a size of the foreign matter, a proximity of the foreign matter to the sensor 114, or another identifiable characteristic of accumulated foreign matter on the flow control member 98. The controller 84 may identify the absence of the obstruction condition where the accumulation of foreign matter on the flow control member 98 is less than the accumulation threshold. As shown, for example, in FIGS. 15A to 15B, obstructing foreign matter 154, such as ice or other foreign matter, may accumulate (e.g., accrete) on the flow control member 98 (e.g., the inflatable boot 102) during operation of the propulsion system 20 (e.g., during flight). The inflatable boot 102 of FIGS. 15A-B is shown in an inflated condition, however, the obstructing foreign matter 154 or other foreign material may also accumulate on the inflatable boot 102 in a deflated or intermediate inflation condition. As the obstructing foreign matter 154 or other foreign material accumulates on the inflatable boot 102, the controller 84 may identify the presence of the obstruction condition for the inflatable boot 102 when the accumulation of the obstructing foreign matter 154 or other foreign matter is greater than the accumulation threshold.

In some embodiments, identifying the presence or the absence of the obstruction condition of the flow control member 98 (e.g., the inflatable boot 102) may additionally include identifying a reduced performance condition of the air intake 38. The controller 84 may measure a differential pressure across the air intake 38 using the sensors 96. For example, the controller 84 may measure a differential pressure between the air inlet duct 46 (e.g., the intake inlet 54) and the core flow duct 48 (e.g., the core outlet 56) and/or between the air inlet duct 46 (e.g., the intake inlet 54) and the bypass flow duct 50 (e.g., the bypass outlet 58). The controller 84 may identify a presence of the reduced performance condition where the measured differential pressure is greater than a differential pressure threshold for a given propulsion system 20 operating condition (e.g., engine 22 power, air speed, air temperature, altitude, etc.). The controller 84 may identify an absence of the reduced performance condition where the measured differential pressure is less than the differential pressure threshold. Identifying the presence of the obstruction condition of the flow control member 98 may include identifying (1) the accumulation of foreign matter (e.g., ice) on the flow control member 98 is greater than the accumulation threshold and (2) the presence of the reduced performance condition. Conversely, identifying the absence of the obstruction condition may include identifying (1) the accumulation of foreign matter (e.g., ice) on the flow control member 98 is less than the accumulation threshold or (2) the absence of the reduced performance condition.

Step 1404 removing the obstructing foreign matter 154 by controlling movement of the flow control member 98 (e.g., the inflatable boot 102). The controller 84 may control the actuator 100 (e.g., the fluid regulator 104; see FIGS. 3 and 4) to change a state (e.g., a position, a size, a shape, etc.) of the flow control member 98, in response to identifying the presence of the obstruction condition for the flow control member 98. As shown, for example, in FIGS. 15B to 15C, the controller 84 may control the fluid regulator 104 to position the inflatable boot 102 from the inflated condition (FIG. 15B) to the deflated condition (FIG. 15C) to dislodge and remove the obstructing foreign matter 154 from the inflatable boot 102, by changing a fluid pressure within the inflatable boot 102. The obstructing foreign matter 154 may subsequently be exhausted from the air intake 38 through the bypass flow duct 50. For further example, the controller 84 may alternatively control the fluid regulator 104 to position the inflatable boot 102 from the deflated condition (FIG. 15B) to the inflated condition (FIG. 15C) to dislodge and remove the obstructing foreign matter 154 from the inflatable boot 102. In some embodiments, the controller 84 may control the fluid regulator 104 to repeatedly cycle the inflatable boot 102 between a higher fluid pressure (e.g., the inflated condition) and a lower fluid pressure (e.g., the deflated condition) to dislodge and remove the obstructing foreign matter 154 from the inflatable boot 102. In some further embodiments, the controller 84 may control the fluid regulator 104 to repeatedly cycle the inflatable boot 102 between the inflated condition and the deflated condition until the controller 84 identifies the absence of the obstruction condition for the flow control member 98.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An aircraft propulsion system comprising:

an air intake including an intake body forming an air passage; and an air intake control system including a flow control assembly, a blockage sensor assembly, and a controller, the flow control assembly including a flow control member and an actuator, the flow control member disposed within the air intake, the actuator operably connected to the flow control member to selectively change a state of the flow control member to change one or both of an air flow direction or an air flow rate of an air flow through the air passage, the blockage sensor assembly including a blockage sensor having a sensing area directed to the flow control member, the blockage sensor configured to produce a signal indicative of an accumulation of foreign matter on the flow control member within the sensing area, and the controller connected in signal communication with the blockage sensor, the controller including a processor connected in signal communication with memory storing instructions which, when executed by the processor, cause the processor to:

identify a presence or an absence of an obstruction condition of the flow control member, the presence of the obstruction condition identified where the signal is indicative of the accumulation being greater than an accumulation threshold; and remove the foreign matter from the flow control member, in response to identifying the presence of the obstruction condition, by controlling the actuator to change the state of the flow control member.

2. The aircraft propulsion system of claim 1, wherein the flow control member includes an inflatable boot.

3. The aircraft propulsion system of claim 2, wherein the actuator includes a fluid regulator connected in fluid communication with the inflatable boot, and the fluid regulator is configured to control the state of the inflatable boot between an inflated condition and a deflated condition.

4. The aircraft propulsion system of claim 3, wherein removing the foreign matter from the flow control member includes repeatedly cycling the inflatable boot between the inflated condition and the deflated condition.

5. The aircraft propulsion system of claim 1, wherein the blockage sensor assembly includes a mounting adapter mounting the blockage sensor to the intake body.

6. The aircraft propulsion system of claim 5, wherein the mounting adapter is mounted to the intake body on an exterior of the intake body.

7. The aircraft propulsion system of claim 5, wherein the mounting adapter includes a heating assembly disposed at the blockage sensor.

8. The aircraft propulsion system of claim 7, wherein the heating assembly includes an air inlet and an internal air passage, the air inlet is connected in fluid communication with the internal air passage, and the internal air passage extends about the blockage sensor.

9. The aircraft propulsion system of claim 1, wherein:

the air intake control system further includes an air flow sensor assembly within the air intake, the air flow sensor assembly includes one or more sensors configured to measure one or more air flow condition parameters within the air intake, and the controller is connected in signal communication with the air flow sensor assembly; and identifying the presence of the obstruction condition further includes identifying a presence or an absence of a reduced performance condition of the air intake using the one or more air flow condition parameters, and the presence of the obstruction condition is identified where the presence of the reduced performance condition is identified and the accumulation is greater than the accumulation threshold.

10. The aircraft propulsion system of claim 9, wherein the one or more air flow condition parameters includes a differential pressure of the air intake, and the reduced performance condition is identified where the differential pressure is greater than a differential pressure threshold.

11. A method for removing foreign matter from a flow control assembly of an air intake of an aircraft propulsion system, the method comprising:

measuring, at a controller, an accumulation at a flow control member of the flow control assembly;

identifying, at the controller, a presence or an absence of an obstruction condition of the flow control member, the presence of the obstruction condition identified where the accumulation is greater than an accumulation threshold; and removing the foreign matter from the flow control member, in response to identifying the presence of the obstruction condition, by controlling an actuator with the controller to change a state of the flow control member.

12. The method of claim 11, wherein the flow control member includes an inflatable boot, and changing the state of the flow control member includes controlling the actuator to change a fluid pressure within the inflatable boot.

13. The method of claim 12, wherein removing the foreign matter from the flow control member includes controlling the actuator to one or both of inflate or deflate the inflatable boot.

14. The method of claim 12, wherein removing the foreign matter from the flow control member includes repeatedly cycling the fluid pressure between a lower fluid pressure and a higher fluid pressure.

15. The method of claim 11, wherein the blockage sensor is disposed within a mounting adapter mounted to an exterior of the air intake, and the method further includes heating the blockage sensor with a heating assembly disposed at the mounting adapter.

16. An aircraft propulsion system comprising:

An aircraft propulsion system comprising:

an air intake including an intake body forming an air passage, the intake body including an air inlet duct, a core flow duct, and a bypass flow duct, the air inlet duct including an intake inlet of the air intake, the core flow duct extending between and to the air inlet duct and a core outlet of the air intake, the bypass flow duct extending between and to the air inlet duct and a bypass outlet of the air intake; and an air intake control system including a flow control assembly and a blockage sensor assembly, the flow control assembly including a flow control member and an actuator, the flow control member disposed within the air intake, the actuator operably connected to the flow control member to selectively position the flow control member to change one or both of an air flow direction or an air flow rate of an air flow through the air passage, and the blockage sensor assembly including a mounting adapter and a blockage sensor, the mounting adapter mounted to an exterior of the intake body, the blockage sensor mounted within the mounting adapter, the blockage sensor having a sensing area directed to the flow control member, the blockage sensor configured to measure an accumulation of foreign matter on the flow control member within the sensing area.

17. The aircraft propulsion system of claim 16, wherein the flow control member includes an inflatable boot, the actuator includes a fluid regulator connected in fluid communication with the inflatable boot, and the fluid regulator is configured to control the inflatable boot in at least an inflated condition and a deflated condition.

18. The aircraft propulsion system of claim 17, wherein the inflatable boot is disposed within the bypass flow duct.

19. The aircraft propulsion system of claim 17, wherein the inflatable boot is disposed within the air inlet duct.

20. The aircraft propulsion system of claim 17, wherein the intake body includes a splitter disposed between the core flow duct and the bypass flow duct, and the inflatable boot is disposed at the splitter.

* * * * *